US011950150B2

(12) United States Patent
Awada et al.

(10) Patent No.: US 11,950,150 B2
(45) Date of Patent: Apr. 2, 2024

(54) MOBILITY ROBUSTNESS AND HANDLING FOR ENHANCED HANDOVER

(71) Applicant: NOKIA TECHNOLOGIES OY, Espoo (FI)

(72) Inventors: Ahmad Awada, Munich (DE); Ingo Viering, Munich (DE); Jedrzej Stanczak, Poznan (PL)

(73) Assignee: Nokia Technologies Oy, Espoo (FI)

( * ) Notice: Subject to any disclaimer, the term of this patent is extended or adjusted under 35 U.S.C. 154(b) by 428 days.

(21) Appl. No.: 17/309,158

(22) PCT Filed: Nov. 2, 2018

(86) PCT No.: PCT/EP2018/080030

§ 371 (c)(1),
(2) Date: Apr. 30, 2021

(87) PCT Pub. No.: WO2020/088777

PCT Pub. Date: May 7, 2020

(65) Prior Publication Data

US 2021/0400549 A1 Dec. 23, 2021

(51) Int. Cl.
*H04W 36/18* (2009.01)
*H04W 36/00* (2009.01)
(Continued)

(52) U.S. Cl.
CPC . *H04W 36/00837* (2018.08); *H04W 36/0058* (2018.08); *H04W 36/0079* (2018.08); *H04W 60/06* (2013.01)

(58) Field of Classification Search
CPC ....... H04W 36/00837; H04W 36/0058; H04W 36/0079; H04W 60/06
See application file for complete search history.

(56) References Cited

U.S. PATENT DOCUMENTS 10,499,294 B1 * 12/2019 Tayal .................... H04W 76/27
2017/0041815 A1 * 2/2017 Fernandez Arboleda .................. H04W 24/04

(Continued)

FOREIGN PATENT DOCUMENTS

CN 101048001 A 10/2007
CN 101779493 A 7/2010

(Continued)

OTHER PUBLICATIONS

3GPP TSG-RAN WG2#100, R2-1713606 Title: Conditionalk Handover (Year: 2017).*

(Continued)

*Primary Examiner* — Faruk Hamza
*Assistant Examiner* — Abusayeed M Haque

(57) ABSTRACT

A source network apparatus (10) which provides access for a user equipment (30) to a communication network transmits (S102) a handover command to the user equipment (30), the handover command indicating a target network apparatus (20) for providing access for the user equipment (30) to the communication network, and a detach condition on when the user equipment (30) is to detach from the source network apparatus (10) after having accessed the target network apparatus (20) (S204) and received user plane data packets from the target network apparatus (20) (S205), wherein the source network apparatus (10) continues exchanging user plane data packets with the user equipment (30) (S101, S103) until the user equipment (30) detaches (S306) from the source network apparatus (10).

19 Claims, 7 Drawing Sheets

(51) Int. Cl.
*H04W 36/12* (2009.01)
*H04W 60/06* (2009.01)

(56) References Cited

U.S. PATENT DOCUMENTS

| | | | | |
|---|---|---|---|---|
| 2017/0201923 | A1* | 7/2017 | Yang | H04L 43/16 |
| 2017/0201973 | A1* | 7/2017 | Yang | H04W 24/08 |
| 2017/0237783 | A1* | 8/2017 | Yang | H04L 65/1016<br>370/331 |
| 2017/0265204 | A1* | 9/2017 | Paria | H04W 48/20 |
| 2017/0366920 | A1* | 12/2017 | Agiwal | H04W 4/02 |
| 2019/0364565 | A1* | 11/2019 | Hmimy | H04W 36/06 |

FOREIGN PATENT DOCUMENTS

| | | | | |
|---|---|---|---|---|
| CN | 107690163 A | 2/2018 | | |
| KR | 20170114258 A | 10/2017 | | |
| KR | 20180118047 A | 10/2018 | | |
| WO | WO-2017025773 A1 * | 2/2017 | | H04W 24/02 |
| WO | 2017180258 A1 | 10/2017 | | |
| WO | WO-2018141287 A1 * | 8/2018 | | H04W 36/0088 |
| WO | WO-2018175721 A1 * | 9/2018 | | H04W 24/08 |
| WO | 2018194326 A1 | 10/2018 | | |
| WO | WO-2018194326 A1 * | 10/2018 | | H04W 36/00 |

OTHER PUBLICATIONS

3GPP TSG-RAN WG2 NR AH#1801, Tdoc R2-1801332 Title: Mobility Enhancement in NR (Year: 2018).*

Office Action for India Application No. 202147024134, dated Jul. 19, 2022, 7 pages.

International Search Report and Written Opinion for International Application No. PCT/EP2018/080030, dated Mar. 4, 2019, 24 pages.

3GPP TSG-RAN WG2 #100, R2-1713606; "Conditional Handover"; Reno, Nevada, USA; Nov. 27-Dec. 1, 2017; 5 pages.

3GPP TSG-RAN WG2 Meeting #100, R2-1712603 (Resubmission of R2-1710430); "Discussion on the Suppoart of MBB and RACH-less in NR"; Reno, Nevada, USA; Nov. 27-Dec. 1, 2017; 7 pages.

3GPP TSG-RAN WG2#104, R2-1817396; "Enhancements to Make-Before-Break"; Spokane, Washington, USA; Nov. 12-16, 2018; 5 pages.

3GPP TSG-RAN WG2 NR AH#1801, R2-1801332; "Mobility Enhancements in NR", Vancouver, Canada; Jan. 22-26, 2018; 4 pages.

Communication under Rule 71(3) EPC for European Application No. 18796654.4, dated Sep. 26, 2023, 43 pgs.

3GPP TSG-RAN2 Meeting #103bis, R2-1813796; Agenda Item: 12.3.2; Source: OPPO; "Discussion on Failure Handling of Handover"; Chengdu, China; Oct. 8-12, 2018; 3 pages.

Communication under Rule 71(3) EPC for European Application No. 18796654.4, dated Dec. 7, 2023, 9 pages.

Office Action for Chinese Application No. 201880100575.7, dated Dec. 14, 2023, 12 pages.

3GPP TSG-RAN WG2 Meeting#100, R2-1712603 (Resubmission of R2-1710430); "Discussion on the Support of MBB and RACH-less in NR"; Source: ZTE Corporation, Sanechips; Agenda Item: 10.2.10; Reno, Nevada, USA; Nov. 27-Dec. 1, 2017; 7 pages.

* cited by examiner

| | | *T304* | | | |
|---|---|---|---|---|---|
| | | ***Not started*** | ***Running*** | ***Expired*** | ***Stopped (success)*** |
| *T310* | ***Not started*** | None | None | Target cell access failure → initiate simplified RRC Connection Re-establishment to source cell (continue RLM with T310/N310) | T310 is initialized, RLM applied to target cell |
| | ***Running*** | None | None | Target cell access failure → initiate classical RRC Connection Re-establishment or simplified RRC Connection Re-establishment (continue RLM with T310/N310) | T310 is initialized, RLM applied to target cell |
| | ***Expired*** | Declare RLF and initiate classical RRC Connection Re-establishment | UE does not declare RLF | Declare handover failure and initiate classical RRC Connection Re-establishment | UE may send to the network an RLF Report |

Fig. 6

MOBILITY ROBUSTNESS AND HANDLING FOR ENHANCED HANDOVER

CROSS-REFERENCE TO RELATED APPLICATIONS

This application is a national stage entry of International Application No. PCT/EP2018/080030, filed Nov. 2, 2018, entitled "MOBILITY ROBUSTNESS AND HANDLING FOR ENHANCED HANDOVER" which is hereby incorporated by reference in its entirety.

TECHNICAL FIELD

At least some embodiments relate to mobility robustness for enhanced handover (HO), e.g. a handover procedure according to enhanced make-before-break (eMBB), a handover procedure with zero interruption time, etc., e.g. in Long Term Evolution (LTE) systems, New Radio (NR) systems, etc.

BACKGROUND

A procedure called "enhanced make-before-break" achieves a 0 ms interruption time in intra- or inter-frequency HO. This procedure builds on top of baseline HO where a source base station (BS) (e.g. NR NodeB (gNB), LTE NodeB (eNB)) and a UE continue radio communication after transmission of an HO command. The connection between the source BS and the UE is released after the UE can send or has received Packet Data Convergence Protocol (PDCP) packets from a target BS (e.g. gNB, eNB).

LIST OF ABBREVIATIONS

3GPP Third Generation Partnership Project
5G Fifth Generation
AMF Access and Mobility Management Function
ARQ Automatic Repeat Request
BLER Block Error Rate
BS Base Station
CHO Conditional HO
C-RNTI Cell-Radio Network Temporary Identifier
DL Downlink
eMBB enhanced Make-Before-Break
gNB NR NodeB
HARQ Hybrid Automatic Repeat Request
HO Handover
LTE Long Term Evolution
MAC Medium Access Control
NR New Radio
PDCCH Physical Downlink Control Channel
PDCP Packet Data Convergence Protocol
PDU Protocol Data Unit
PRACH Physical RACH
RACH Random Access Channel
RF Radio Frequency
RLC Radio Link Control
RLF Radio Link Failure
RLM Radio Link Monitoring
RRC Radio Resource Control
SN Sequence Number
SRB Signaling Radio Bearer
TRX Transceiver
UE User Equipment
UL Uplink
UPF User Plane Function

SUMMARY

To provide robustness for the above-mentioned enhanced make-before-break procedure, the HO command should be provided early enough such that it can be successfully received by the UE with high probability. The problem with this solution is that the UE should not detach immediately from the source BS after accessing the target BS and receiving the PDCP packets from the target BS.

At least some example embodiments deal with how and when a UE shall detach a connection from a source network apparatus in a procedure such as an enhanced make-before-break procedure with robustness gain/early transmission of HO command.

Further, at least some example embodiments deal with handling radio link monitoring and failure in a procedure such as an enhanced make-before-break procedure.

According to at least some example embodiments, methods, apparatuses and a non-transitory computer-readable medium are provided as specified in the appended claims.

In the following example embodiments and example implementations will be described with reference to the accompanying drawings.

BRIEF DESCRIPTION OF THE DRAWINGS

FIG. 6 shows a table illustrating UE actions triggered by timers T304 or T310 expiry during eMBB handover.

DESCRIPTION OF THE EMBODIMENTS

As mentioned beforehand, the enhanced make-before-break (eMBB) procedure that achieves a 0 ms interruption time in intra- or inter-frequency HO builds on top of baseline HO where the source BS (e.g. NR NodeB (gNB), LTE NodeB (eNB)) and the UE continue the radio communication after the transmission of the HO command. The connection between the source BS and the UE is released after the UE can send or has received Packet Data Convergence Protocol (PDCP) packets from the target BS (e.g. NR NodeB (gNB), LTE NodeB (eNB)).

The enhanced make-before-break procedure also builds on top of a make-before-break procedure of 3GPP Release 14 that assumed only a single transceiver (TRX) at the UE side, which limitation leaves a residual HO interruption of ~5 ms.

Figure 1:
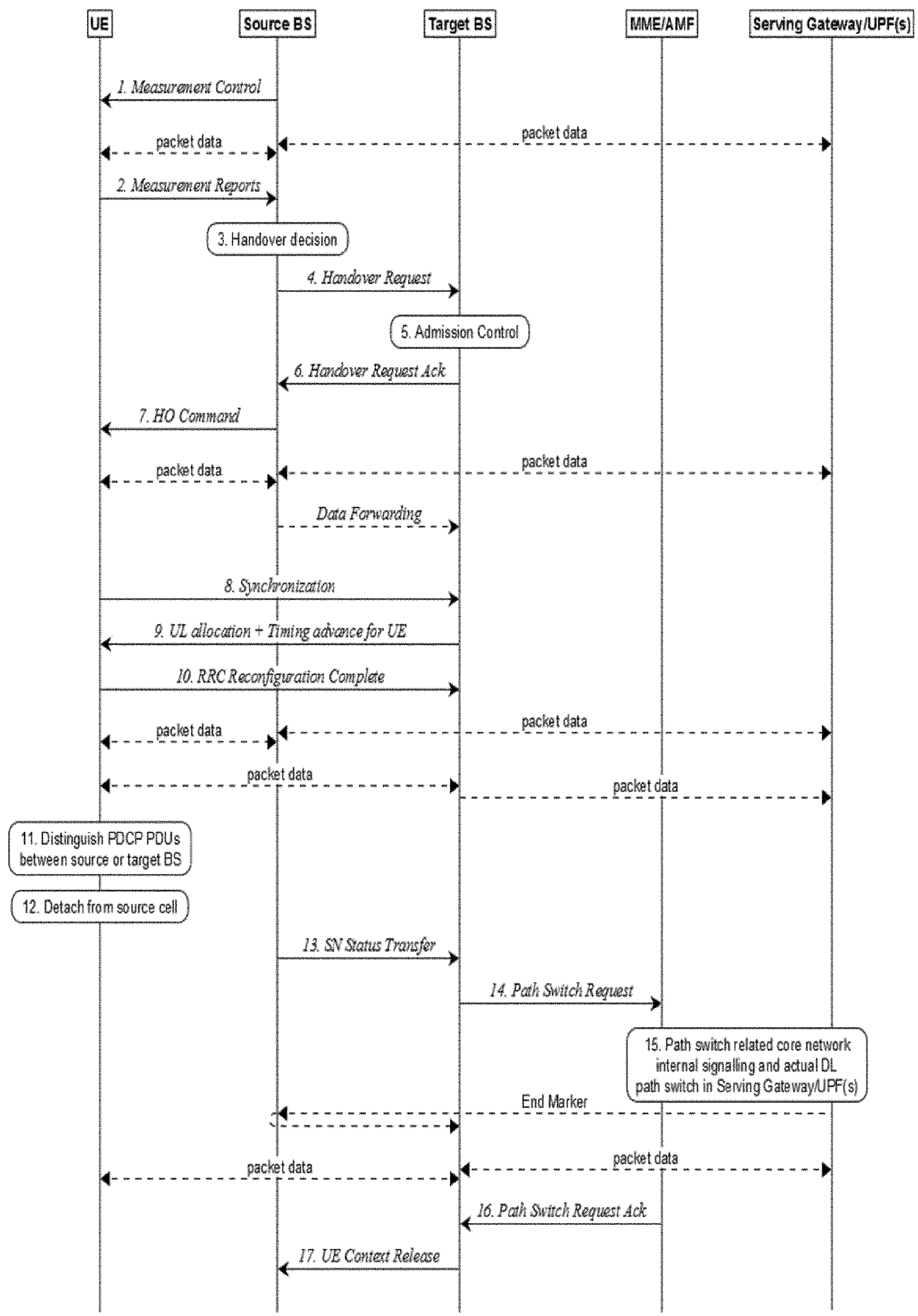
FIG. 1 shows a signaling diagram illustrating an enhanced make-before-break procedure.

FIG. 1 shows one exemplary implementation for an enhanced make-before-break procedure. FIG. 1 illustrates communication between UE, source BS (e.g. gNB, eNB) as a network apparatus for providing access for the UE to a communication network (e.g. NR, LTE), a target BS as a network apparatus for providing access for the UE to the communication network, MME/AMF and Serving Gateway/UPF(s).

Communication of packet data, e.g. PDCP Protocol Data Units (PDUs) (also referred to as user plane data packets) between UE, source BS, target BS and Serving Gateway/UPF(s) is indicated by dashed line arrows in FIG. 1.

Steps 1 to 6 of FIG. 1 are the same as in NR baseline HO, described e.g. in 3GPP TS 38.300, Overall description; Stage 2 (Release 15).

In step 7 of FIG. 1, a handover command sent by the source BS can contain an indication of enhanced make-before-break to inform the UE that the source BS will continue the transmission/reception of PDCP Protocol Data Units (PDUs).

In steps 8 to 10 of FIG. 1, the UE performs access to the target cell (target BS) while receiving/transmitting PDCP PDUs from/to the source BS.

After step 10 of FIG. 1, as shown by step 11 of FIG. 1, the UE distinguishes the PDCP PDUs between source and target BSs that can be ciphered using different security keys.

In step 12 of FIG. 1, having received or being able to receive PDCP PDUs from target BS, the UE detaches from source BS.

It is up to network implementation when the source BS sends SN Status Transfer message in step 13 of FIG. 1 to the target BS e.g. upon detecting a missing Medium Access Control (MAC) Hybrid Automatic Repeat Request (HARQ)/or Radio Link Control (RLC) Automatic Repeat Request (ARQ) feedback from the UE. For lossless HO, the SN Status Transfer message provides the Sequence Number (SNs) of the next missing downlink (DL) and uplink (UL) PDCP PDUs that the target BS shall send or receive, respectively.

In steps 13-17 of FIG. 1, path switch from source BS to target BS is executed and completed.

The procedure of FIG. 1 requires a hardware and RF design of the UE that allow simultaneous transmission and reception to two intra-/inter-frequency cells ("two TRXs").

The procedure depicted in FIG. 1 can help to achieve 0 ms interruption time but it does not improve the robustness of the HO as the timing of the HO command transmission is same as in baseline HO, e.g., when the signal of the target BS is X dB better than that of source BS, i.e., as such the UE may fail to receive the HO command.

The duration that the UE is connected to both source and target BSs is relatively small as the UE detaches from source BS as soon as the UE can receive/or has received PDCP PDUs from the target BS.

To provide robustness for an enhanced make-before-break procedure as shown in FIG. 1, the HO command should be provided early enough such that it can be successfully received by the UE with high probability. For instance, the HO command can be sent to the UE when the signal of the target BS is Q dB lower than that of source BS. Having received the HO command, the UE then proceeds to access the target BS as shown in steps 8 to 10 of FIG. 1.

The problem with this solution is that the UE should not detach immediately from the source BS after accessing the target BS in step 10 of FIG. 1 (sending RRC Reconfiguration Complete) and receiving the PDCP PDUs from the target BS. This is because the radio link of target BS may not be stable enough due to early transmission of the HO command and access to target BS. As such, the connection of the UE to the source BS shall be detached later once the radio link of the target BS becomes stable enough. Consequently, the duration that the UE is connected to both source and target BSs is longer than that shown in FIG. 1 when the HO command is sent earlier.

Figure 2:
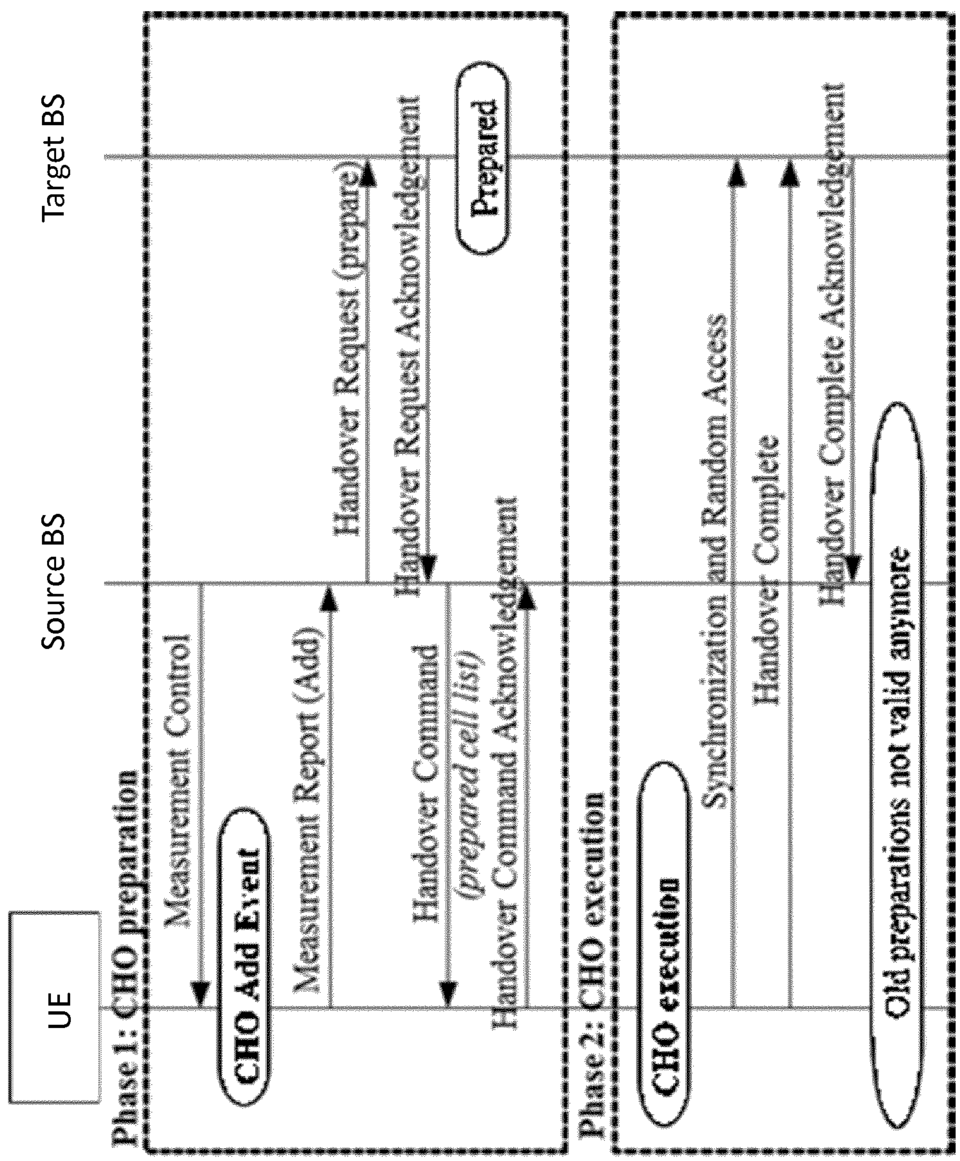
FIG. 2 shows a signaling diagram illustrating a conditional handover procedure.

Conditional HO (CHO) is a procedure that improves the robustness of the HO by de-coupling an HO preparation phase from an HO execution phase, as illustrated in FIG. 2. In the CHO preparation phase (phase 1), a source BS prepares early for a UE at least one target BS such that the UE can still receive successfully the Handover Command. For instance, a CHO add event in FIG. 2 is triggered when the signal of the target BS is Q dB lower than that of the source BS. Unlike normal HO, the HO command contains a condition on when to detach from source BS and start the access to the prepared target cell, i.e., the UE does not perform immediate access to the target BS after receiving the HO command.

After receiving the HO command from the source BS, the UE evaluates continuously the configured condition. If the configured condition expires, the UE detaches from the source BS and performs access to the target BS. Typically, the condition expires when the radio link of the target BS is strong enough to resume the connection of the UE, e.g., the signal of the target BS is X dB better than that of the source BS.

In the CHO procedure, the connection to the source BS is released before the UE has performed access to the target BS whereas in the enhanced make-before-break procedure with early transmission of the HO command, the source BS shall be released after the UE has successfully accessed the target BS and received PDCP PDUs. As such, the enhanced make-before-break procedure with early transmission of the HO command does not only provide mobility robustness like the CHO procedure, but can also achieve 0 ms service interruption.

According to at least some embodiments, a procedure based on the enhanced make-before-break solution is proposed, in which a network apparatus (e.g. source or target BS) may provide a UE e.g. in an RRC Reconfiguration (HO Command) with a condition on when to detach the source BS after accessing the target BS and being served by both source and target BSs.

Figure 3:
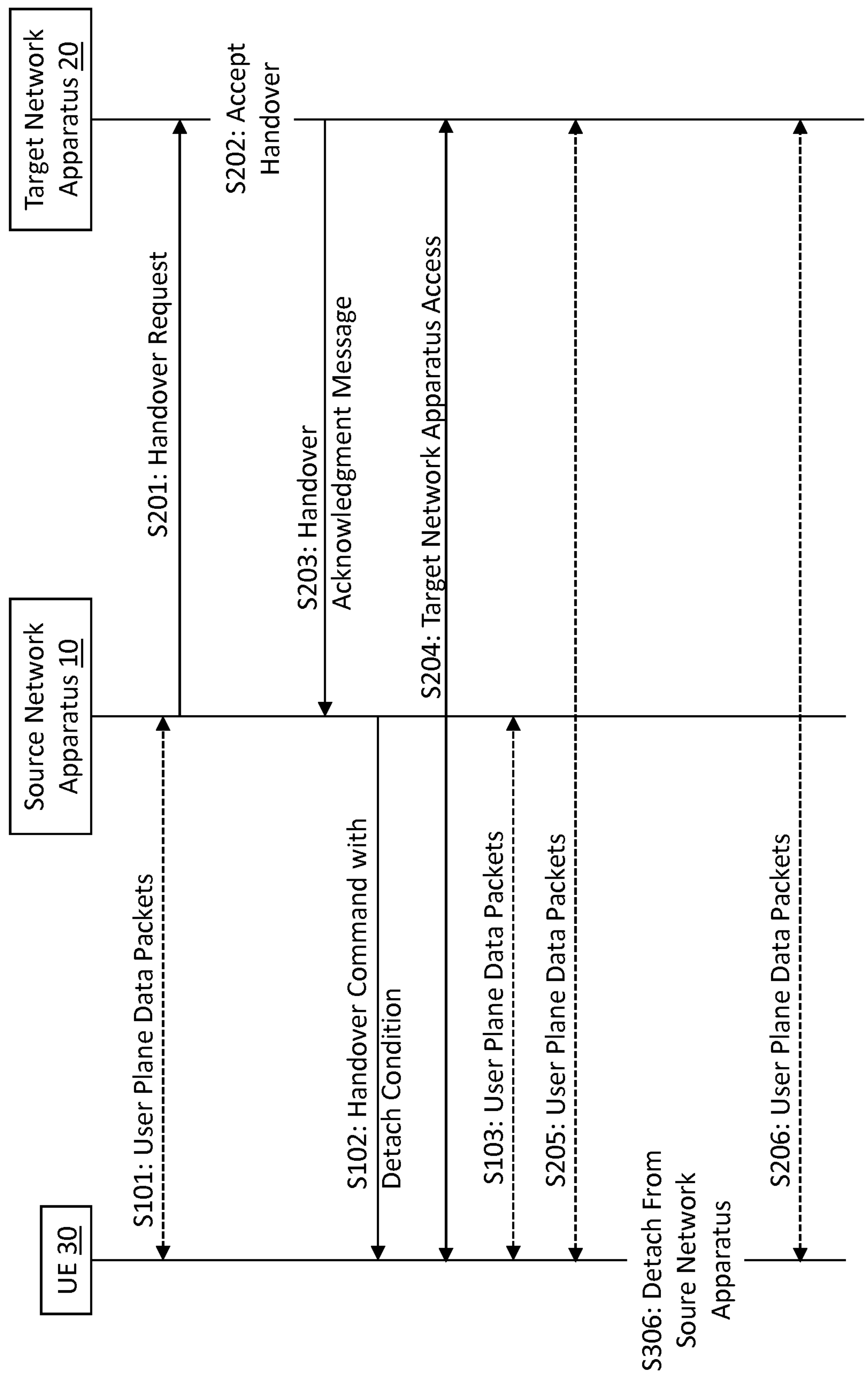
FIG. 3 shows a signaling diagram illustrating processes according to at least some embodiments.

FIG. 3 shows a signaling diagram illustrating processes according to at least some embodiments.

A source network apparatus 10 (e.g. a source gNB, eNB, etc.) provides access for a UE 30 to a communication network (e.g. an LTE network, NR network, etc.) and exchanges user plane data packets with the UE 30 as illustrated by S101.

In S102, the source network apparatus 10 transmits a handover command to the UE 30, the handover command indicating a target network apparatus (e.g. a target gNB, eNB) 20 for providing access for the UE 30 to the communication network, and a detach condition on when the UE 30 is to detach from the source network apparatus 10 after having accessed the target network apparatus 20 and received user plane data packets from the target network apparatus 20. According to an example implementation, the detach condition is specified by the source network apparatus 10.

The source network apparatus 10 continues exchanging user plane data packets with the UE 30, as illustrated in S103, until the user equipment detaches from the source network apparatus 10, as illustrated in S306

According to an example embodiment, the source network apparatus 10 receives, from the UE 30, measurement reports comprising a signal strength of a signal transmitted by the source network apparatus 10 and a signal strength of a signal transmitted by the target network apparatus 20, and transmits the handover command in S102 when the signal strength of the signal transmitted by the target network apparatus different by a predetermined amount (e.g. Q dB lower for providing early transmission of the HO command) than the signal strength of the signal transmitted by the source network apparatus. For example, the handover command is transmitted in case the signal transmitted by the source network apparatus is slightly better than the signal of the target network apparatus (e.g. 1 dB) but not much better like baseline HO (e.g. 3 dB).

Referring to FIG. 3, in S201 the target network apparatus 20 receives a handover request from the source network apparatus 10 providing access for the UE 30 to the communication network.

Upon accepting the handover request in S202, in S203 the target network apparatus 20 transmits, to the source network apparatus 10, a handover acknowledgment message. According to an example implementation, the target network apparatus specifies the detach condition on when the UE 30 is to detach from the source network apparatus 10 after having accessed the target network apparatus 20 and received user plane data packets from the target network apparatus 20, and forwards the detach condition to the source network apparatus 10 in the handover acknowledgment message.

In S204, the target network apparatus 20 provides access for the UE 30 to the communication network, and exchanges user plane data packets with the UE 30 as illustrated in S205, S206.

As illustrated in S101 and S103, the UE 30 exchanges user plane data packets with the source network apparatus 10 that provides access for the UE 30 to the communication network.

In S102, the UE 30 receives a handover command from the source network apparatus 10, the handover command indicating the target network apparatus 20 for providing access for the UE 30 to the communication network, and the detach condition on when the UE 30 is to detach from the source network apparatus 10 after having accessed the target network apparatus 20 and received user plane data packets from the target network apparatus 20. Access to the target network apparatus 20 is shown by S204, and receipt of user plane data packets from the target network apparatus 20 is shown by S205.

As illustrated by S103, the UE 30 continues exchanging user plane data packets with the source network apparatus 20 until the user equipment detaches from the source network apparatus in S306. After S306, the UE 30 exchanges user plane data packets with the target network apparatus 20 as illustrated by S206.

According to a first example embodiment, a UE autonomous procedure is provided, in which at least one of the source and target network apparatuses (also referred to as "the network") configures the UE 30 with a condition (detach condition) to detach autonomously. For instance, the UE 30 detaches in S306, if a received signal of the source network apparatus 10 falls X dB below that of the target network apparatus 20.

According to a second example embodiment, a network-controlled procedure is provided, in which at least one of the source and target network apparatuses configures the UE 30 with a condition (detach condition). If the condition expires, the UE 30 sends a report to the source and/or target network apparatus which in turn will send back an RRC Reconfiguration releasing the source network apparatus 10. Upon receiving the RRC Reconfiguration, the UE 30 detaches from the source network apparatus 10.

If the configured condition is not present in the HO command (e.g. the network decides for enhanced make-before-break without mobility robustness), the UE will detach autonomously after accessing the target network apparatus and receiving PDCP PDUs without checking radio link qualities of source and target network apparatuses.

The proposed procedure is different from a straightforward combination of CHO and eMBB. A simple combination of CHO shown in FIG. 2 and eMBB shown in FIG. 1 results in the following:

1. A source BS delivers a HO command early;
2. The source BS and UE continue with DL/UL transmission/reception after transmission of the HO command;
3. Access of the UE to a target BS is postponed: The UE performs access once the configured CHO condition expires; and
4. After the UE performed access to the target BS and started to receive PDCP PDUs from both BSs, the UE detaches autonomously from the source BS.

This simple combination of CHO and eMBB may lead to service interruption if the link to the source BS degrades before the UE performs access to the target BS.

According to at least some embodiments, instead of postponing the access to the target network apparatus, the access to the target network apparatus occurs immediately, and the detach of the source cell is postponed which is a much safer approach. According to at least some embodiments:

1. The source network apparatus delivers the HO command early;
2. The source network apparatus and the UE continue with the DL/UL transmission/reception after the transmission of the HO command;
3. The UE performs immediately the access to the target network apparatus after having received the HO command;
4. After the UE performed access to the target network apparatus and started to receive PDCP PDUs from both cells, the UE waits for the detach condition to expire for detaching from the source network apparatus.

Figure 4:
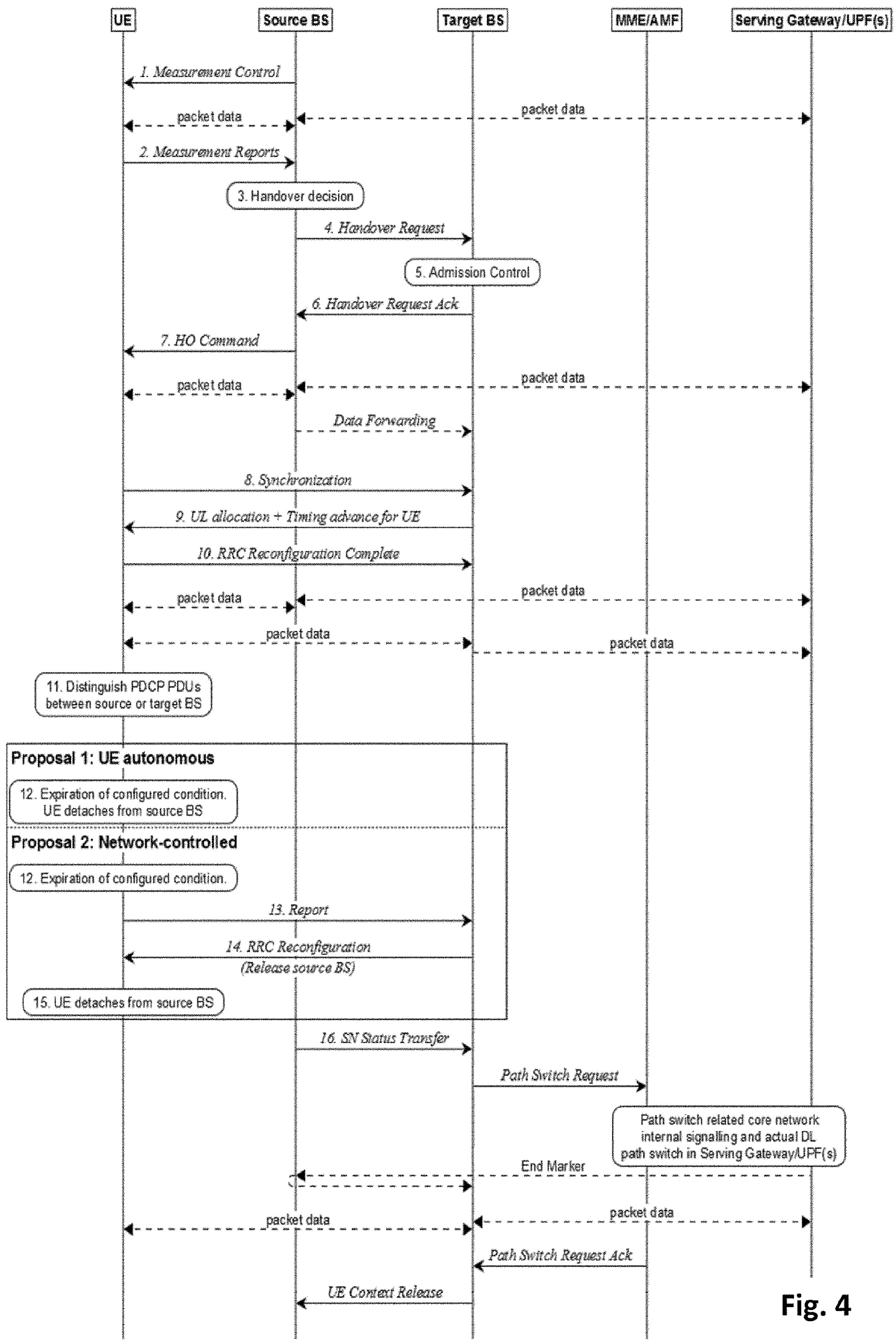
FIG. 4 shows a signaling diagram illustrating proposals 1 and 2 according to at least some example implementations.

FIG. 4 illustrates example implementations for the first and second example embodiments. Proposal 1 in FIG. 4 illustrates UE-autonomous detach according to the first example embodiment, and Proposal 2 in FIG. 4 illustrates network-controlled detach according to the second example embodiment for the case when the UE sends a report to the target network apparatus.

FIG. 4 illustrates communication between a UE as an example of the UE 30 of FIG. 3, a source BS as an example of the source network apparatus 10 of FIG. 3, a target BS as an example of the target network apparatus 20 of FIG. 3, MME/AMF and Serving Gateway/UPF(s).

Communication of packet data, e.g. PDCP Protocol Data Units (PDUs) (also referred to as user plane data packets) between UE, source BS, target BS and Serving Gateway/UPF(s) is indicated by dashed line arrows in FIG. 4.

Steps 1 to 6 of FIG. 4 are the same as in NR baseline HO, described e.g. in 3GPP TS 38.300, Overall description; Stage 2 (Release 15).

In step 7 of FIG. 4, a handover command is sent by the source BS, which corresponds to the handover command of S102 in FIG. 3, including the detach condition.

In steps 8 to 10 of FIG. 4, the UE performs access to the target cell (target eNB) while receiving/transmitting PDCP PDUs from/to the source BS.

After step 10 of FIG. 4, as shown by step 11 of FIG. 4, the UE distinguishes the PDCP PDUs between source and target BSs that can be ciphered using different security keys.

According to the first example embodiment, in step 12 of FIG. 4, the UE detects expiration of the configured condition (the detach condition) and detaches from the source BS. Step 16 of FIG. 4 follows.

According to the second example embodiment, in step 12 of FIG. 4, the UE detects expiration of the configured condition (the detach condition). In step 13 of FIG. 4, the UE reports to the target BS. In step 14 of FIG. 4, the UE receives, from the target BS in response to the report, an RRC reconfiguration message to release the source BS. Then, in step 15 of FIG. 4, the UE detaches from the source BS.

It is up to network implementation when the source BS sends SN Status Transfer message in step 16 of FIG. 4 to the target BS e.g. upon detecting a missing Medium Access Control (MAC) Hybrid Automatic Repeat Request (HARQ)/ or Radio Link Control (RLC) Automatic Repeat Request (ARQ) feedback. For lossless HO, the SN Status Transfer message provides the Sequence Number (SNs) of the next missing downlink (DL) and uplink (UL) PDCP PDUs that the target BS shall send or receive, respectively.

In the following steps of FIG. 4, path switch from source BS to target BS is executed and completed.

According to at least some embodiments, if the network decides to provide mobility robustness and 0 ms interruption time using enhanced make-before-break, the RRC Reconfiguration providing the HO command is extended with a condition (detach condition) on when to detach from the source BS after having accessed the target BS and received PDCP PDUs.

Otherwise, if the HO command is not extended with the detach condition, the UE detaches autonomously after having accessed the target BS and received PDCP PDUs without checking e.g. radio link qualities of source and target BSs.

According to a first option, for both UE autonomous and network-controlled procedures, the network configures a measurement event. The detach condition of the measurement event can be set to one of the following:

The signal measurement of the source BS is below than a threshold T1, e.g. a signal strength of a signal transmitted by the source network apparatus, measured by the UE, is below a first threshold T1.

The signal measurement of the target BS is higher than a threshold T2, e.g. a signal strength of a signal transmitted by the target network apparatus, measured by the UE, exceeds a second threshold T2.

The signal measurement of the source BS is X dB below that of the target BS, e.g. a signal strength of a signal transmitted by the source network apparatus, measured by the UE, is lower by a predetermined amount than a signal strength of a signal transmitted by the target network apparatus, measured by the UE.

The signal measurement of the source BS is smaller than T3 and the signal measurement of the target BS is higher than T4, e.g. a signal strength of a signal transmitted by the source network apparatus, measured by the UE, is below a third threshold T3, and a signal strength of a signal transmitted by the target network apparatus, measured by the UE, exceeds a fourth threshold T4.

According to a second option, the detach condition is based on a number of missing HARQ/ARQ feedback reports sent by the network to the UE. For example:

The number of missing HARQ feedback reports for UE UL data transmission is higher than threshold T5 (fifth threshold).

The number of missing RLC ARQ feedback reports for UE UL data transmission is higher than threshold T6 (sixth threshold).

According to a third option, the detach condition expires when a certain timer such as T310, used for radio link failure detection, starts (a certain number of L3 out-of-sync has been reached); the source network apparatus is kept as long as possible in this case which maximizes mobility robustness against failures (but may cause overhead).

According to an example implementation, for UE autonomous procedure, the HO Command/Measurement Configuration/Reporting Configuration includes one bit (e.g. set to 1) informing the UE to suppress the measurement report and to detach autonomously and immediately once the detach condition expires.

According to an example implementation, the detach condition for UE autonomous or network-controlled procedure is provided by the target BS during handover preparation. For example, the target BS specifies the detach condition in a transparent RRC container that is sent to the source BS using "Handover Request Ack" message. The source BS forwards the RRC container to the UE using the HO command.

According to an example implementation, the detach condition for UE autonomous or network-controlled procedure is provided directly by the source BS in the HO command.

According to an example implementation, the UE starts to evaluate the detach condition after having accessed the target BS and received the PDCP PDUs.

In the following, handling of radio link monitoring (RLM) and failure detection, either Radio Link Failure (RLF) or HO failure, will be considered.

A UE shall monitor downlink (DL) radio link quality of a cell based on cell-specific reference signals and compare it against two thresholds Qout and Qin which are defined as a level at which the radio link cannot be reliably received and shall correspond to e.g. 10% and e.g. 2% BLER of a hypothetical Physical Downlink Control Channel (PDCCH) transmission, respectively. If the radio link quality estimated over the last e.g. 200 ms becomes lower than Qout, layer 1 sends an out-of-sync indication to higher layers. A timer T310 is started by the UE upon receiving N310 consecutive out-of-sync indications from lower layers.

When the DL radio link quality of the cell estimated over the last e.g. 100 ms period becomes better than the threshold Qin, layer 1 of the UE sends an in-sync indication to higher layers. The timer T310 stops upon receiving N311 consecutive in-sync indications from lower layers, otherwise the timer T310 expires and the UE detects an RLF.

In current 3GPP specifications, the UE stops the timer T310 (used for RLM) and starts a timer T304 (used for HO failure detection) after receiving the HO command as shown in step 7 of FIG. 1. The timer T304 is stopped if MAC successfully completes a random access procedure or if the MAC indicates the successful reception of a Physical Downlink Shared Channel (PDSCH) transmission addressed to Cell-Radio Network Temporary Identifier (C-RNTI). If the UE fails to access the target cell (e.g. target BS) and the timer T304 expires, the UE declares a handover failure and initiates RRC connection re-establishment procedure.

Figure 5:
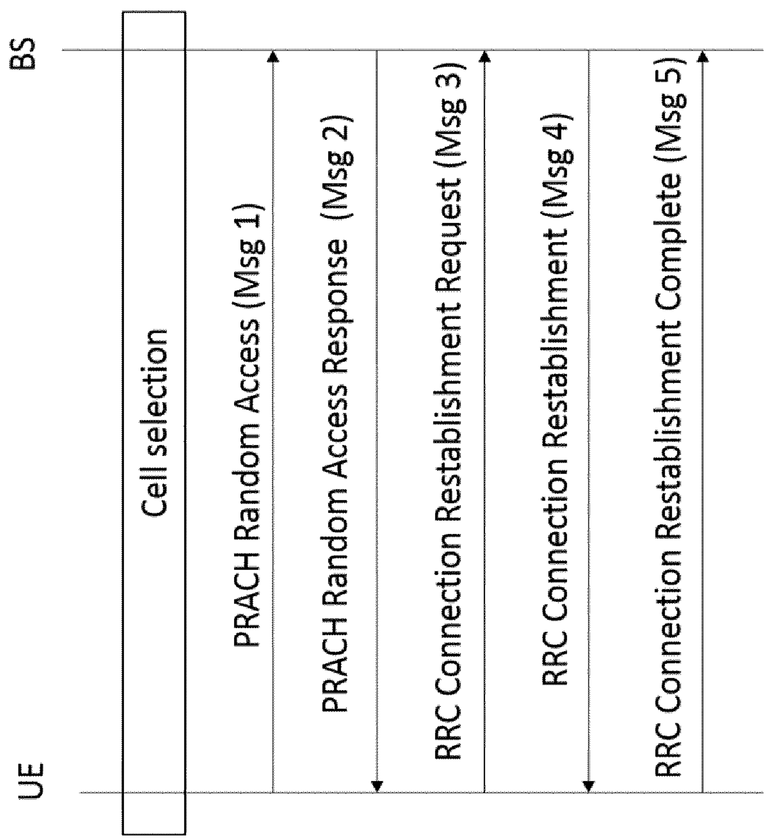
FIG. 5 shows a signaling diagram illustrating an RRC connection re-establishment procedure.
Figure 7:
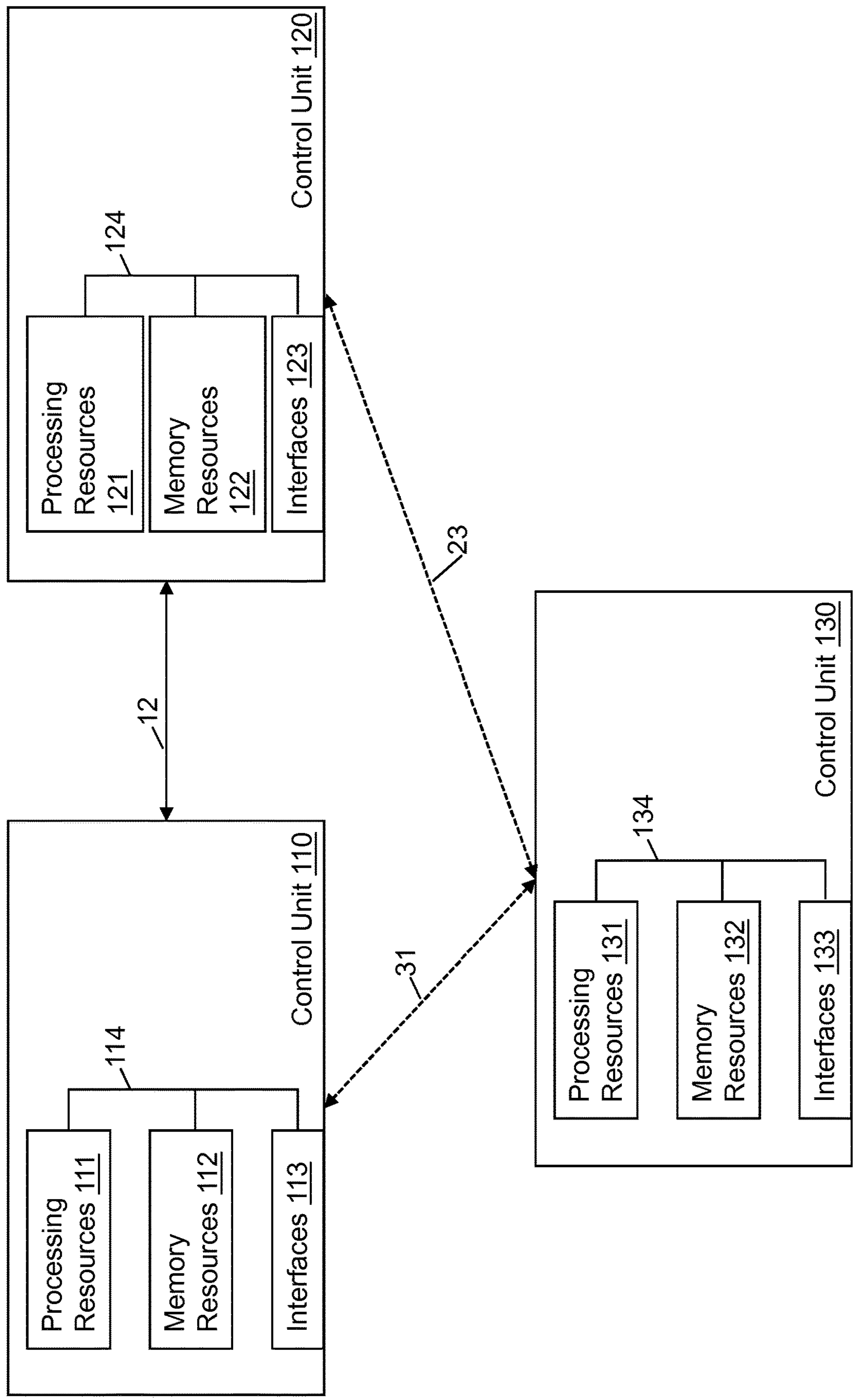
FIG. 7 shows a schematic block diagram illustrating a configuration of control units in which examples of embodiments are implementable.

Steps of RRC connection re-establishment are shown in FIG. 5. During cell selection as depicted in FIG. 5, the UE sends a PRACH random access message Msg 1 to a BS of the communication network. The BS answers with a PRACH random access response message Msg 2. Upon receiving the message Msg 2, the UE transmits an RRC connection re-establishment message Msg 3 to the BS. The BS answers with an RRC connection re-establishment message Msg 4. Upon receiving the message Msg 4, the UE transmits an RRC connection re-establishment complete message Msg 5.

In the enhanced make-before-break procedure illustrated in FIG. 1, the UE continues the transmission and the reception of user plane data with the source BS after receiving the HO command, and even while UE is accessing the target BS. However, in current 3GPP specifications it is not specified yet which of the source or target BSs will provide signaling radio bearers (SRBs) that are used for exchanging RRC messages. For example, after receiving the handover command in step 7 of FIG. 1, the UE may assume that the anchor point for RRC is the target BS. That is, the SRB will be provided by the target BS after performing RACH access. The reasons behind this assumption are as follows:

The UE immediately performs RACH access after receiving the HO command. The time that the source BS cannot send an RRC Re-configuration to the UE (from step 7 to step 10 in FIG. 1) is relatively short, i.e., ~5 ms to ~40 ms.

The UE detaches from the source BS after starting to exchange user data with the target BS (after step 10 in FIG. 1). Having the target BS as anchor point for RRC right after HO command saves in this case the burden of switching the SRB from source to target BS.

The signal strength and quality of the target BS is expected to be much better (and/or to become better) than that of the source BS if the HO is triggered in the proper time.

At least some embodiments deal with the following problems:

How to avoid user data interruption in case of handover failure when the UE is configured with enhanced make-before-break HO: When the UE fails to access the target cell (target BS) while T304 is running due to e.g. early triggering of the HO, the UE has to initiate the RRC re-establishment which involves cell selection and RACH procedure as shown in FIG. 5, causing service interruption, i.e., the radio communication is re-established from scratch.

How to perform RLM (using timer T310) in enhanced make-before-break HO and how to handle T304 timer such that a smooth fall back to the source cell is ensured in case of handover failure.

At least some embodiments propose enhancements for RRC re-establishment procedure in case of handover failure when the UE is configured with enhanced make-before-break HO as illustrated in FIGS. 1 and 4. According to an example embodiment, a connection re-establishment request is triggered with respect to the source BS without performing cell selection or RACH access, i.e., timing advance is known to the UE as it resumes the data transmission/reception with the source BS.

At least some embodiments propose an RLM (using timer T310) scheme and handling of timer T304 that can ensure a smooth fall back to the source cell (e.g. source BS) in case of handover failure and proper detection of RLF and handover failure. According to an example embodiment, in case a handover failure occurs, i.e. the UE fails to access the target BS e.g. in steps 8 to 10 in FIG. 1, step S204 in FIG. 3, or steps 8 to 10 in FIG. 4, it sends a connection re-establishment request (e.g. Msg 3 of FIG. 5) to the source BS without performing cell selection and RACH access on either Physical Uplink Control Channel (PUCCH), e.g., 1 bit, or MAC Control Element (CE), e.g., with new type, or as an "RRC Connection Re-establishment Request" message that is sent on SRB0.

According to an example embodiment, upon receiving the request from the UE, the source BS may fetch a UE context from the target BS and re-establishes/or resumes the RRC connection.

According to an example implementation, the source BS indicates for the UE to re-use a previously stored RRC configuration for re-establishment of SRB1. Such indication can be conveyed directly on PDCCH e.g., 1 bit, or using MAC CE, e.g., with a new type.

According to an alternative example implementation, the source BS sends "RRC Connection Re-establishment" on SRB0 to command the UE to re-establish SRB1.

Now the RLM scheme and handling of timer T304 according to at least some embodiments will be described. The timer T304 also is referred to as first timer for detecting a handover failure, e.g., for detecting that the target network apparatus cannot be accessed. The timer T310 also is referred to as second timer for detecting a radio link failure, or as timer for radio link failure detection.

In general, it is assumed that the timer T310 applied for the source BS continues (is not stopped), if it is running, upon the reception of HO command including make-before-break indication (i.e. the indication that the source BS will continue the transmission/reception of PDCP PDUs). Also, T310 shall be started (by N310 out-of-syncs) even after the HO command is received. Moreover, timer T304 for handover failure detection is started.

In case of successful HO execution (e.g. in case the UE has accessed the target BS), the timer T310 applied for the source BS is stopped once the UE either receives a RACH response (step 9 in FIG. 1, step S204 in FIG. 3, step 9 in FIG. 4) or starts to receive/transmit packet data from/to target BS (after step 10 in FIG. 1, step S205 in FIG. 3, after step 10 in FIG. 4).

In this case, the timer T304 is stopped as well and the timer T310 is re-initialized to zero and applied for the target BS.

In the following, failure to access the target BS and fallback to source BS according to at least some embodiments will be described by referring to the table shown FIG. 6, which summarizes UE actions triggered by T304 or T310 expiry during enhanced make-before-break handover shown in FIG. 1, and/or during handover shown in FIGS. 3 and 4.

If the timer T304 expires while the timer T310 did not start to run (e.g. the UE fails to access the target BS but the link of the source BS is still available), the UE does not perform the RRC connection re-establishment procedure depicted in FIG. 5, but it rather sends the connection re-establishment request directly to the source BS using one of the procedures described above (which may be referred to here as simplified RRC Connection Re-establishment).

If the timer T304 expires while the timer T310 is running (e.g. the UE fails to access the target BS but the link of the source BS may be still available), the UE performs either 1) the RRC connection re-establishment depicted in FIG. 5, or 2) sends the connection re-establishment request directly to the source BS using one of the procedures described above. The choice between 1) and 2) can be either left for the UE implementation or is configured by the network in the HO command, i.e., one bit to select between 1) or 2).

According to an example implementation, after falling back to the source BS, the timer T310 is not reinitialized to zero, which helps to react faster to a change in radio conditions.

If the timer T310 expires while the timer T304 has not been started (e.g. the UE is connected only to the source BS and is not in handover execution phase), the UE declares RLF and performs RRC connection re-establishment procedure that is depicted in FIG. 5.

In the following, procedures according to at least some embodiments in case of a failure of the source BS during the access of the target BS will be described, referring to the table shown in FIG. 6.

If the timer T310 expires (i.e. the link of the source BS is weak) while the timer T304 is running, the UE does not declare an RLF (e.g. suppresses the RLF). Such an RLF would have high likelihood of being in vain; instead, the access to the target BS should be granted a fair chance (i.e. until T304 expiry) to be successful.

Nevertheless, according to an example implementation, the UE reports later this failure of the source BS while accessing or after having accessed the target BS to the network (T304 is stopped and T310 expired as shown in FIG. 6), e.g. via RLF Report. The RLF report can be fetched by a serving cell (the target cell that the UE executes the handover to or any other serving cell) from the UE, i.e., the UE sends the RLF report, if available. Such RLF report can trigger the network to take actions for avoiding the RLF causing service interruption on source BS in enhanced make-before-break, e.g., by triggering the HO a bit earlier.

If the timer T304 expires after the expiry of the timer T310 (i.e. the handover to the target BS has failed and the link of the source BS is no longer available), the UE declares a handover failure and performs RRC connection re-establishment procedure that is depicted in FIG. 5.

Now reference is made to FIG. 5 for illustrating a simplified block diagram of various electronic devices that are suitable for use in practicing at least some embodiments.

FIG. 5 shows a control unit 110 comprising processing resources (processing circuitry) 111, memory resources (memory circuitry) 112 and interfaces (interface circuitry) 113, coupled via a connection 114. According to an example implementation, the control unit 110 is part of and/or used by the source network apparatus 10 of FIG. 3, e.g. for performing steps S101 to S103.

The memory resources 112 store a program assumed to include program instructions that, when executed by the processing resources 111, enable the control unit 110 to operate in accordance with the example embodiments and example implementations, as detailed above.

The control unit 110 is connected via a connection 12 to a control unit 120. The control unit 120 comprises processing resources (processing circuitry) 121, memory resources (memory circuitry) 122 and interfaces (interface circuitry) 123, coupled via a connection 124. According to an example implementation, the control unit 120 is part of and/or used by the target network apparatus 20 of FIG. 3, e.g. for performing steps S201 to S206.

The memory resources 122 store a program assumed to include program instructions that, when executed by the processing resources 121, enable the control unit 120 to operate in accordance with the example embodiments and example implementations, as detailed above.

The control unit 110 is connected via a connection 31 to a control unit 130. The control unit 130 comprises processing resources (processing circuitry) 131, memory resources (memory circuitry) 132 and interfaces (interface circuitry) 133, coupled via a connection 134. According to an example implementation, the control unit 130 is part of and/or used by the UE 30 of FIG. 3, e.g. for performing steps S101, S102, S204, S103, S205, S306 and S206.

The memory resources 132 store a program assumed to include program instructions that, when executed by the processing resources 131, enable the control unit 130 to operate in accordance with the example embodiments and example implementations, as detailed above.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

Further, as used in this application, the term "circuitry" refers to one or more or all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

It is to be understood that the above description is illustrative and is not to be construed as limiting. Various modifications and applications may occur to those skilled in the art without departing from the scope as defined by the appended claims.

The invention claimed is:

1. An apparatus comprising at least one processor and at least one memory including computer instructions, when executed by the at least one processor, cause the apparatus to:

receive, by a user equipment, a handover command from a source network apparatus providing access for the user equipment to a communication network, the handover command indicating a target network apparatus for providing access for the user equipment to the communication network;

continue to exchange, by the user equipment, user plane data packets with the source network apparatus until the user equipment detaches from the source network apparatus;

after having received the handover command, start, by the user equipment, a first timer for detecting that the target network apparatus cannot be accessed;

in case of having accessed the target network apparatus before the first timer expires, stop, by the user equipment, the first timer and re-initializing a second timer applied for the source network apparatus for detecting a radio link failure to zero and applying the second timer for the target network apparatus; and in case the second timer applied for the source network apparatus expires while the first timer is running, suppress the radio link failure of the source network apparatus and report the radio link failure to the communication network while or after accessing the target network apparatus.

2. The apparatus of claim 1:

further configured to receive a detach condition on when the user equipment is to detach from the source network apparatus after having accessed the target network apparatus and received user plane data packets from the target network apparatus.

3. The apparatus of claim 2, further configured to cause the apparatus to:

after having received the handover command, perform access to the target network apparatus and exchanging user plane data packets with the target network apparatus; and wait for the detach condition to expire for detaching from the source network apparatus.

4. The apparatus of claim 3, further configured to cause the apparatus to:

in case the user equipment is to perform network-controlled detaching from the source network apparatus, when the detach condition has expired, transmit, to at least one of the source network apparatus and the target network apparatus, a report message indicating that the detach condition has expired; and upon receiving a reconfiguration message for releasing the source network apparatus as a response to the report message, detach from the source network apparatus.

5. The apparatus of claim 3, further configured to cause the apparatus to:

in case the user equipment is to perform autonomous detaching from the source network apparatus, when the detach condition has expired, detach from the source network apparatus.

6. The apparatus of claim 3, further configured to cause the apparatus to:

in case the target network apparatus cannot be accessed, send a connection re-establishment request to the source network apparatus without performing a random access channel access.

7. The apparatus of claim 6, further configured to cause the apparatus to:

in case the first timer expires and the second timer applied for the source network apparatus has not been started, send the connection re-establishment request to the source network apparatus without performing the random access channel access;

in case the first timer expires and the second timer applied for the source network apparatus has been started and is still running, either send the connection re-establishment request to the source network apparatus without performing the random access channel access or perform the connection re-establishment request with cell selection and the random access channel access; and in case the second timer applied for the source network apparatus expires while the first timer has not been started, detect the radio link failure of the source network apparatus and perform the connection re-establishment request with the random access channel access.

8. The apparatus of claim 7, further configured to cause the apparatus to:

in case the first timer expires after the second timer applied for the source network apparatus has expired, detecting a handover failure which indicates that the target network apparatus cannot be accessed, and performing the connection re-establishment request with cell selection and the random access channel access.

9. The apparatus of claim 7, wherein the user equipment starts the second timer applied for the source network apparatus when a quality of a link to the source network apparatus is detected to fall under a first quality threshold, and stops the second timer applied for the source network apparatus when the quality of the link is detected to exceed a second quality threshold.

10. The apparatus of claim 2, wherein the detach condition comprises at least one of a measurement event, a number of missing feedback reports, and start of a certain timer.

11. The apparatus of claim 10, wherein the measurement event comprises at least one of the following:

a signal strength of a signal transmitted by the source network apparatus, measured by the user equipment, is below a first threshold;

a signal strength of a signal transmitted by the target network apparatus, measured by the user equipment, exceeds a second threshold;

a signal strength of a signal transmitted by the source network apparatus, measured by the user equipment, is lower by a predetermined amount than a signal strength of a signal transmitted by the target network apparatus, measured by the user equipment; and a signal strength of a signal transmitted by the source network apparatus, measured by the user equipment, is below a third threshold and a signal strength of a signal transmitted by the target network apparatus, measured by the user equipment, exceeds a fourth threshold.

12. The apparatus of claim 10, wherein the number of missing feedback reports comprises at least one of the following:

a number of missing hybrid automatic repeat request feedback reports for user equipment uplink data transmission is higher than a fifth threshold; and a number of missing radio link control automatic repeat request feedback reports for user equipment uplink data transmission is higher than a sixth threshold.

13. The apparatus of claim 10, wherein the certain timer comprises a timer for radio link failure detection indicating that a certain number of L3 out-of-sync has been reached.

14. The apparatus of claim 1, wherein:

the handover command further indicates whether the user equipment is to perform autonomous or network-controlled detaching from the source network apparatus.

15. An apparatus comprising at least one processor and at least one memory including computer instructions, when executed by the at least one processor, cause the apparatus to:

receive, by a user equipment, a handover command from a source network apparatus providing access for the user equipment to a communication network, the handover command indicating a target network apparatus for providing access for the user equipment to the communication network;

continue to exchange, by the user equipment, user plane data packets with the source network apparatus until the user equipment detaches from the source network apparatus;

after having received the handover command, perform, by the user equipment, access to the target network apparatus;

in case the target network apparatus cannot be accessed, send, by the user equipment, a connection re-establishment request to the source network apparatus without performing a random access channel access;

after having received the handover command, start, by the user equipment, a first timer for detecting that the target network apparatus cannot be accessed;

in case of having accessed the target network apparatus before the first timer expires, stop, by the user equipment, the first timer and re-initializing a second timer applied for the source network apparatus for detecting a radio link failure to zero and applying the second timer for the target network apparatus; and in case the second timer applied for the source network apparatus expires while the first timer is running, suppress, by the user equipment, the radio link failure of the source network apparatus and report the radio link failure to the communication network while or after accessing the target network apparatus.

16. The apparatus of claim 15, further configured to cause the apparatus to:

in case the first timer expires and the second timer applied for the source network apparatus has not been started, sending the connection re-establishment request to the source network apparatus without performing the random access channel access;

in case the first timer expires and the second timer applied for the source network apparatus has been started and is still running, either sending the connection re-establishment request to the source network apparatus without performing the random access channel access or performing the connection re-establishment request with the random access channel access; and in case the second timer applied for the source network apparatus expires while the first timer has not been started, detecting the radio link failure of the source network apparatus and performing the connection re-establishment request with cell selection and the random access channel access.

17. The apparatus of claim 15, further configured to cause the apparatus to:

in case the first timer expires after the second timer applied for the source network apparatus has expired, detect a handover failure which indicates that the target network apparatus cannot be accessed, and perform the connection re-establishment request with cell selection and the random access channel access.

18. The apparatus of claim 15, wherein the apparatus starts, by the user equipment, the second timer applied for the source network apparatus when a quality of a link to the source network apparatus is detected to fall under a first quality threshold, and stops the second timer applied for the source network apparatus when the quality of the link is detected to exceed a second quality threshold.

19. A method comprising:

receiving, by a user equipment, a handover command from a source network apparatus providing access for the user equipment to a communication network, the handover command indicating a target network apparatus for providing access for the user equipment to the communication network;

continue exchanging, by the user equipment, user plane data packets with the source network apparatus until the user equipment detaches from the source network apparatus;

after having received the handover command, starting, by the user equipment, a first timer for detecting that the target network apparatus cannot be accessed;

in case of having accessed the target network apparatus before the first timer expires, stopping, by the user equipment, the first timer and re-initializing a second timer applied for the source network apparatus for detecting a radio link failure to zero and applying the second timer for the target network apparatus; and in case the second timer applied for the source network apparatus expires while the first timer is running, suppressing the radio link failure of the source network apparatus and reporting the radio link failure to the communication network while or after accessing the target network apparatus.

* * * * *